United States Patent [19]
Tutt et al.

[11] Patent Number: 5,632,616
[45] Date of Patent: May 27, 1997

[54] METHOD AND APPARATUS FOR INJECTING AIR INTO LONG CEMENT KILNS

[75] Inventors: James R. Tutt, Nash, Tex.; Eric R. Hansen, Shawnee, Kans.; Michael P. Heap, Salt Lake City, Utah

[73] Assignees: Cadence Environmental Energy, Inc., Michigan City, Ind.; Ash Grove Cement Company, Overland Park, Kans.

[21] Appl. No.: 345,314

[22] Filed: Nov. 28, 1994

[51] Int. Cl.$^6$ ............................................. F27B 7/36
[52] U.S. Cl. ................................... 432/105; 110/246
[58] Field of Search ........................... 432/103, 105, 432/109, 111, 113; 110/246

[56] References Cited

U.S. PATENT DOCUMENTS

| | | | |
|---|---|---|---|
| 2,813,822 | 11/1957 | Collier | 202/6 |
| 3,377,056 | 9/1966 | Boye | 263/3 |
| 3,507,482 | 4/1970 | Kraszewski et al. | 263/32 |
| 3,865,541 | 2/1975 | Wilson et al. | 423/13 |
| 3,888,621 | 6/1975 | Williams | 432/19 |
| 3,916,806 | 11/1975 | Giraud | 110/14 |
| 4,123,332 | 10/1978 | Rotter | 201/15 |
| 4,126,471 | 11/1978 | Herchenbach et al. | 263/32 |
| 4,249,890 | 2/1981 | Graham | 423/13 |
| 4,256,503 | 3/1981 | Tsuda et al. | 432/19 |
| 4,273,314 | 6/1981 | Keran et al. | 266/163 |
| 4,276,092 | 6/1981 | St. John et al. | 110/14 |
| 4,286,993 | 9/1981 | Lovichi et al. | 106/100 |
| 4,329,180 | 5/1982 | Herchenbach et al. | 201/15 |
| 4,859,177 | 8/1989 | Kreisberg et al. | 432/105 |
| 4,913,552 | 4/1990 | Bracegirdle | 432/105 |
| 5,031,549 | 7/1991 | Collins, Jr. et al. | 432/113 |
| 5,083,516 | 1/1992 | Benoit et al. | 110/246 |
| 5,286,200 | 2/1994 | Wurz et al. | 432/105 |
| 5,375,535 | 12/1994 | Tutt | 106/761 |
| 5,454,715 | 10/1995 | Hansen et al. | 432/103 |
| 5,549,058 | 8/1996 | Tutt | 110/226 |

*Primary Examiner*—Henry A. Bennett
*Assistant Examiner*—G. Wilson
*Attorney, Agent, or Firm*—Barnes & Thornburg

[57] ABSTRACT

A method and improved apparatus is disclosed for improving combustion efficiency and reducing emission of gaseous pollutants during the manufacture of cement in conventional long rotary kilns. Air is injected through a port in the wall of a rotary cement kiln having a secondary burning zone established by burning solid fuel in contact with the in process mineral at a point downstream, relative to kiln gas flow of the clinkering zone in the kiln. The air injection apparatus is designed to enhance mixing of the injected air with the kiln gas stream and is characterized by high linear flow rates and/or multi-directional air injection ports. The air injection ports can be located downstream of a secondary burning zone to provide staged combustion with concomitant reduction in concentration of $NO_x$, CO and hydrocarbons in the kiln gas stream.

29 Claims, 7 Drawing Sheets

METHOD AND APPARATUS FOR INJECTING AIR INTO LONG CEMENT KILNS

BACKGROUND AND SUMMARY OF THE INVENTION

This invention relates to a method and apparatus for the improved manufacture of cement in wet or dry process long rotary kilns, or in preheater kilns, for processing a mineral material therein to produce cement clinker. More particularly this invention is directed to improvements in the operation and configuration of long rotary cement kilns which have been modified to burn a supplemental fuel in a secondary burning zone of the kiln.

In the widely used commercial process for the manufacture of cement, the steps of drying, calcining, and clinkering cement raw materials are accomplished by passing finely divided raw materials, including calcareous minerals, silica and alumina, through a heated, inclined rotary vessel or kiln. In what is known as conventional long dry or wet process kilns the entire mineral heating process is conducted in a heated rotating kiln cylinder, commonly referred to as a "rotary vessel." The rotary vessel is typically 10 to 15 feet in diameter and 400–700 feet in length and is inclined so that as the vessel is rotated, raw materials fed into the upper end of the kiln cylinder move under the influence of gravity toward the lower "fired" end where the final clinkering process takes place and where the product cement clinker is discharged for cooling and subsequent processing. Kiln gas temperatures in the fired clinkering zone of the kiln range from about 1300° to about 1600° C. Kiln gas temperatures are as low as about 250° to 350° C. at the upper mineral receiving end of so-called wet process kilns. Somewhat higher kiln gas temperatures exist in the upper end of long dry process kilns.

Generally, skilled practitioners consider the cement making process within the rotary kiln to occur in several stages as the raw material flows from the cooler gas exit mineral feed end to the fired/clinker exit lower end of the rotary kiln vessel. As the mineral material moves down the length of the kiln it is subjected to increasing kiln gas temperatures. Thus in the upper portion of the kiln cylinder where the kiln gas temperatures are the lowest, the in-process mineral materials first undergo a drying process and thereafter move down the kiln cylinder until the temperature is raised to calcining temperature. The length of the kiln where the mineral is undergoing a calcining process (releasing carbon dioxide) is designated the calcining zone. The in-process mineral finally moves down the kiln into a zone where gas temperatures are the hottest, the clinkering zone adjacent the fired lower end of the kiln cylinder. The drying zone, the calcining zone, and the clinkering zone typically are not contiguous lengths along the kiln cylinder. The kiln gas stream flows counter to the flow of in-process mineral materials from the clinkering zone, through the intermediate calcining zone and the mineral drying zone and out the upper gas exit end of the kiln into a kiln dust collection system. The flow of kiln gases through the kiln can be controlled to some extent by a draft induction fan positioned in the kiln gas exhaust stream.

Cement kilns have received favorable review from both federal and state environmental regulatory agencies for disposal of both liquid and solid combustible waste materials. Cement kilns provide a combination of high operating temperatures and long residence times, both of which are favorable conditions for complete combustion of organic components of waste and chemical combination of inorganic components with the reactive in-process mineral components. Combustible waste solids provide a source of inexpensive energy for the mineral processing industry.

For many years, regulation compliant use and disposal of waste in operating kilns was limited to combustible liquid or "pumpable" hazardous waste. Liquid waste materials are easily blended with each other and with conventional fuels to provide homogeneous liquids that can be burned in the gaseous phase at the firing end of the kiln with little or no modification of kiln burner configuration. Solid waste derived fuel, however, can occur in multiplicity of forms, from hard crystalline solids to viscous, sticky sludges. They are not easily blended, and they present significant engineering challenges for their safe handling and delivery into rotating kilns.

Several apparatus have been designed to facilitate firing of solid wastes into kilns. See, for example, U.S. Pat. No. 4,850,290, issued Jul. 25, 1989; U.S. Pat. No. 4,930,965, issued Jun. 5, 1990; U.S. Pat. No. 4,974,529, issued Dec. 4, 1990; and U.S. Pat. No. 5,083,516 issued Jan. 7, 1992; incorporated herein by reference. These four patents describe an apparatus and method for delivering containerized waste to both pre-heater type and conventional long wet or dry kilns at the point in the process where the kiln gas temperature is such that volatilized components are consumed with high destruction and removal efficiency. The above-cited patents describe a device for delivering containerized waste through the wall of a kiln cylinder during kiln operation. The apparatus comprises a fuel charging port, preferably with a mechanical closure, formed in the kiln cylinder wall. The fuel charging port is aligned with a drop tube inside the kiln cylinder. The drop tube prevents hot in-process mineral material in the kiln from escaping through the fuel charging port or contacting closure. The device is utilized to deliver containerized waste into a secondary burning zone of the kiln at predetermined time during kiln cylinder rotation.

Other apparatus and methods for delivering solid fuels, especially solid waste derived fuels, are known in the art. See, for example, U.S. Pat. No. 5,078,594, issued Jan. 7, 1992, incorporated herein by reference. The '594 patent discloses a charging apparatus for delivering tires or other combustible waste solids through a port into a rotating kiln. U.S. Pat. No. 5,339,751 owned by the assignees of the present invention discloses a waste derived fuel delivery control method and apparatus capable of charging more than one container or other type of solid waste fuel into the kiln for each revolution of the kiln. In addition, solid waste derived fuel can be fired from an industrial cannon mounted at the lower fired end of the kiln to form a secondary burning zone downstream of the clinkering zone of the kiln. See U.S. Pat. Nos. 5,086,716 and 4,984,983 for examples of industrial cannon fuel delivery systems.

Supplemental fuel added to the kiln may also include natural fossil fuels, such as lump coal, delivered to the rotating kiln. U.S. Pat. No. 5,257,586 discloses one such supplemental fuel delivery apparatus.

Burning a supplemental fuel, either a natural fossil fuel such as lump coal or a waste derived fuel, charged into the kiln reduces fuel consumption of the primary burner at the lower fired end of the kiln. Environmentally sound burning requires complete combustion of the supplemental fuel and optimization of combustion conditions to minimize discharge of carbon monoxide and other products of incomplete combustion into the atmosphere, as well as nitrogen oxides produced in the hot flame of the primary burner.

Responsive to environmental concerns and more rigorous regulating of emission standards, the cement industry has invested in a significant research and development effort to reduce emissions from cement kilns. The present invention provides a method and improved apparatus for improving combustion efficiency and reducing emission of gaseous pollutants during the manufacture of cement in conventional long rotary kilns. Air is injected through a port in the wall of a rotary cement kiln having a secondary burning zone established by burning solid fuel in contact with the in process mineral at a point downstream, relative to kiln gas flow of the clinkering zone in the kiln. The air injection apparatus is designed to enhance mixing of the injected air with the kiln gas stream and is characterized by high linear flow rates and/or multi-directional air injection ports. The air injection ports can be located downstream of a secondary burning zone to provide reduction in concentration of $NO_x$, CO, $SO_2$ and hydrocarbons in the kiln gas stream. Heretofore reduction of $NO_x$ levels in combustion gas effluents has typically been at the cost of higher levels of one or more of the other gaseous contaminants.

One object of the present invention is to promote cross sectional mixing of injected air with the kiln gas stream near a secondary burning zone.

Another object of the present invention is to reduce emissions of carbon monoxide, sulfur dioxide, hydrocarbons, and nitrogen oxides from a kiln which has been modified to burn a supplemental fuel.

Yet another object of the present invention is to increase the oxygen level adjacent the secondary burning zone to support complete combustion of a supplemental fuel charged into the secondary burning zone without disrupting the thermal profile of the burner flame in the primary burning zone at the lower fired end of the kiln.

Still object of the present invention is to increase the amount of supplemental waste derived fuel which may be charged into the kiln so that the burner intensity near the discharge end can be reduced, thereby reducing the amount of fuel consumption by the burner.

Still another object of the present invention is to supply tertiary air to the rotary vessel without the use of complicated sealing arrangements to prevent escape of the tertiary air.

According to one aspect of the present invention, a method is provided for reducing the concentration of nitrogen oxides, as well as a carbon monoxide and other products of incomplete combustion, in the effluent gas emissions during operation of a conventional long rotary cement kiln. The kiln includes a rotary vessel having an upper kiln gas exit end with an adjacent mineral drying zone, an opposite fired clinker exit end with an adjacent clinkering zone and an intermediate mineral calcining zone. During operation, a kiln gas stream flows from said clinkering zone through the calcining zone and out the kiln gas exit end of the rotary vessel. In-process mineral flows from the drying zone through the clinkering zone. The method includes the steps of delivering combustible material into the rotary vessel to burn it in contact with the in-process mineral downstream relative to kiln gas flow of the clinkering zone to create a reducing zone extending downstream from the burning combustible material, injecting air through at least one port in a wall of the rotary vessel and directing said injected air into the kiln gas stream at a point upstream relative to kiln gas flow of the drying zone at a linear flow rate of at least 100 feet per second.

In the illustrated method, the injected air is directed through an air injection tube in air flow communication with the port in the wall of the rotary vessel. The injected air is directed into the kiln gas stream at multiple angles so that at least a portion of the injected air is directed toward the in-process mineral continuously during kiln operation. Illustratively, the injected air is directed radially from a point proximal to the rotational axis of the rotary vessel toward the wall of the rotary vessel.

In one illustrated method, the combustible material is delivered through a port in the wall of the rotary vessel into the calcining zone of the kiln. The combustible material may be a conventional fossil fuel, a combustible waste, or a containerized combustible waste.

The distance between the point of contact of the combustible material with the in-process mineral and a point of injection of air into the kiln gas stream is illustratively at least X, where X=(0.5 second)·R, and where R is the average linear flow rate of the kiln gas stream in the rotary vessel. The air must be injected into the kiln gas stream at a point at which the temperature of the kiln gas stream is at least the minimum temperature required to burn (oxidize) carbon monoxide in the kiln gas stream. In one embodiment air is injected in accordance with this invention at a point where the kiln gas temperature is at least 1600° F. preferably at a point downstream relative to kiln gas flow from the calcining zone. Preferably, the distance between an upstream end relative to kiln gas flow of the reducing zone and the point of injection of air into the kiln gas stream is about (0.5 second)·R to about (3 seconds)·R, where R is the average linear flow rate of the kiln gas stream in the rotary vessel.

According to another aspect of the present invention, a method is provided for reducing the concentration of nitrogen oxides in effluent gas emissions during operation of a conventional long rotary cement kiln. The kiln includes a rotary vessel having an upper kiln gas exit end with an adjacent mineral drying zone, and opposite fired clinker exit end with an adjacent clinkering zone and an intermediate mineral calcining zone. During operation of the kiln, a kiln gas stream flows from said clinkering zone through the calcining zone and out the kiln gas exit end of the rotary vessel. In-process mineral flows from the drying zone through the clinkering zone. The method includes the steps of delivering combustible material into the rotary vessel to burn it in contact with in-process mineral at a point downstream relative to kiln gas flow of the clinkering zone to create a reducing zone extending downstream from the burning combustible material, injecting air through at least one port in the wall of the rotary vessel and directing said injected air into the kiln gas stream upstream relative to kiln gas flow of the drying zone at multiple angles so that at least a portion of the injected air is directed toward the in-process mineral continuously during kiln operation. The method optionally includes the step of promoting mixing of the kiln gas stream as it passes through the reducing zone, for example, installing a choker ring in the reducing zone of a rotary vessel to provide an axial length of reduced cross-sectional area, or by installing baffles or other means to mix upper and lower laminar portions of the kiln gas stream as it moves through the reducing zone.

According to yet another aspect of the present invention, an apparatus is provided for the improved manufacture of cement in a wet or dry process long rotary kiln for processing a mineral material therein to produce cement clinker. The kiln includes a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end. The kiln is modified to burn a supplemental fuel in a secondary burning zone of the kiln located downstream relative to kiln gas flow from the clinkering zone. The apparatus includes a port formed in the rotary vessel upstream relative to kiln gas flow of the drying zone, an air injection tube in air flow communication with the port, and a fan in air flow communication with the air entry port to inject air into the rotary vessel through the port and the air injection tube. The apparatus also includes means coupled to the air injection tube for directing the injected air into the kiln gas stream at multiple angles relative to a longitudinal axis of rotation of the rotary vessel.

In the illustrated embodiment, the air injection tube is configured to prevent in-process mineral material from passing through the port, and the fan is mounted on the rotary vessel. In one illustrated embodiment, the directing means includes a deflector mounted on an air discharge end of the air injection tube inside the rotary vessel to disperse the air entering the rotary vessel through the air injection tube at multiple angles relative to the longitudinal axis of rotation of the rotary vessel. In another illustrated embodiment, the rotary vessel includes an array of air entry ports angularly spaced on a surface of the rotary vessel and a circumferential air supply duct extending around the rotary vessel in air flow communication with the fan and the array of air entry ports. In yet another illustrated embodiment, the directing means includes at least two air injection nozzles mounted on an air discharge end of the air injection tube inside the rotary vessel. The nozzles are aligned at different angles relative to the longitudinal axis of rotation of the rotary vessel. In an illustrated embodiment, the fan has a capacity to inject the air into the kiln gas stream at a linear flow rate of at least 100 feet per second. Preferably, the fan has a capacity to inject the air into the kiln gas stream at a linear flow rate of about 200 feet per second to about 500 feet per second.

According to still another aspect of the present invention, an apparatus is provided for the improved manufacture of cement in a wet or dry process long rotary kiln for processing a mineral material therein to produce cement clinker. The kiln includes a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end. The kiln is modified to burn a supplemental fuel in a secondary burning zone of the kiln located downstream relative to kiln gas flow from the clinkering zone. The apparatus includes a port formed in the rotary vessel at a point upstream relative to kiln gas flow of the drying zone, an air injection tube in air flow communication with the port, and a fan in air flow communication with the air entry port to inject air into the rotary vessel through the port and the air injection tube. The apparatus also includes at least one air injection nozzle coupled to the air injection tube. The at least one nozzle injecting air into the kiln gas stream at a linear flow rate of at least 100 feet per second.

In the illustrated embodiment, a plurality of air injection nozzles are coupled to an air discharge end of the air injection tube inside the rotary vessel. The nozzles are aligned at multiple angles relative to a longitudinal axis of rotation of the rotary vessel. In another illustrated embodiment, a rotary valve coupled to the air discharge end of the air injection tube. The rotary valve is configured to direct air flow from at least one of the plurality of nozzles continuously toward the in-process mineral during rotation of the rotary vessel. The rotary valve has a stationary valve body including a plurality of air flow passageways. Each air flow passageway is aligned in air flow communication with a selected one of the plurality of nozzles. The rotary valve also includes a gravity actuated movable plate configured to block air flow into upwardly directed passageways of the valve body during rotation of the rotary vessel.

According to another aspect of the present invention, an apparatus is provided for the improved manufacture of cement in a wet or dry process long rotary kiln for processing a mineral material therein to produce cement clinker. The kiln includes a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end. The kiln is modified to burn a supplemental fuel in a secondary burning zone of the kiln located downstream relative to kiln gas flow from the clinkering zone. The apparatus includes a port formed in the rotary vessel at a point located a predetermined distance downstream relative to kiln gas flow from an upstream end of the secondary burning zone. The predetermined distance is between about (0.5 second)·R and about (3 seconds)·R, where R is the average linear flow rate of the kiln gas stream in the rotary vessel. The apparatus also includes an air injection tube in air flow communication with the port, and a fan in air flow communication with the air entry port to inject air into the rotary vessel through the port and the air injection tube.

According to another aspect of the present invention, an apparatus is provided for the improved manufacture of cement in a wet or dry process long rotary kiln for processing a mineral material therein to produce cement clinker. The kiln includes a rotary vessel having a fired lower end and an adjacent clinkering zone, an upper kiln gas exit end and an adjacent mineral drying zone, an intermediate calcining zone along its length, and a kiln gas stream flowing from the fired lower end to the upper gas exit end. The kiln is modified to burn a supplemental fuel in a secondary burning zone of the kiln located downstream relative to kiln gas flow from the clinkering zone. The apparatus includes a port formed in the rotary vessel upstream relative to kiln gas flow of the drying zone, a fan in air flow communication with the air entry port to inject air into the rotary vessel through the port, and an air injection tube in air flow communication with the port. The air injection tube is configured to impart rotational momentum to the injected air about a longitudinal axis of the rotary vessel. In the illustrated embodiment, the air injection tube is configured to inject air underneath the in-process mineral during rotation of the rotary vessel.

Additional objects, features and advantages of the invention will become apparent to those skilled in the art upon consideration of the following detailed description of the preferred embodiments exemplifying the best mode of carrying out the invention as presently perceived.

DETAILED DESCRIPTION OF THE INVENTION

This invention relates to an apparatus and method for improving the combustion efficiency and efficiency of fuel utilization in an operating rotary kiln which has been modified to burn a supplemental fuel while reducing emissions of carbon monoxide, nitrogen oxides, hydrocarbons, and sulfur dioxide from the kiln. The present invention also permits environmentally sound disposal of combustible solid wastes in an operating rotary kiln. Rotary kilns can be of the conventional type or of the so-called pre-heater or pre-calcinator type. Common to each, however, is a heated, rotating cylinder containing in-process mineral material. In the widely used commercial process for the production of cement clinker, cement raw materials are calcinated and "clinkered" by passing finely divided raw materials through a rotating inclined rotary vessel or kiln cylinder. The requisite temperature for processing the mineral material is achieved by burning fuel such as gas, fuel oil, powdered coal, and the like in the gaseous atmosphere at the lower end of the kiln with gases moving countercurrent to the solids through the rotating kiln cylinder. With the high temperatures required for the process, fuel costs constitute a significant factor in the ultimate cost of the product. It is known that fuel costs can be reduced through burning of a supplemental fuel into a secondary burning zone of the rotary vessel. Such supplemental fuel may be either a natural fossil fuel such as lump coal, pumpable liquid hazardous fuels, or solid waste materials charged into the secondary burning zone.

One form of hazardous waste which has been successfully utilized in this process is a by-product of the production of liquid waste fuels already marketed by Cadence Environmental Energy Inc. under the name CHEM FUEL® for burning in kiln operations. The solid hazardous waste by-products consist of non-volatile and non-extractable residues which consist principally of high molecular weight resins, polymers and residual volatiles. Preferably, the hazardous waste containerized for use in the present process should have a BTU value of greater than 5,000 BTUs/lb. Free liquids in the solid waste material should be minimized. If present, they may be absorbed using an organic absorbent material such as ground corn cobs or similar BTU contributing material.

Sealable containers for the hazardous waste should be fully compliant with applicable Department of Transportation standards for containment/shipment of hazardous waste materials. Sealable steel pails or fiber drums are preferred. The container contributes both energy (iron is oxidized in the higher temperature zones near the discharge end of the kiln) and material (iron oxides) to the process chemistry. Other containers such as fiber and plastic containers may also be used. The size of the containers is dependent on the energy value of the hazardous waste targeted for disposal and the capacity of the kiln to receive such containers.

Figure 1:
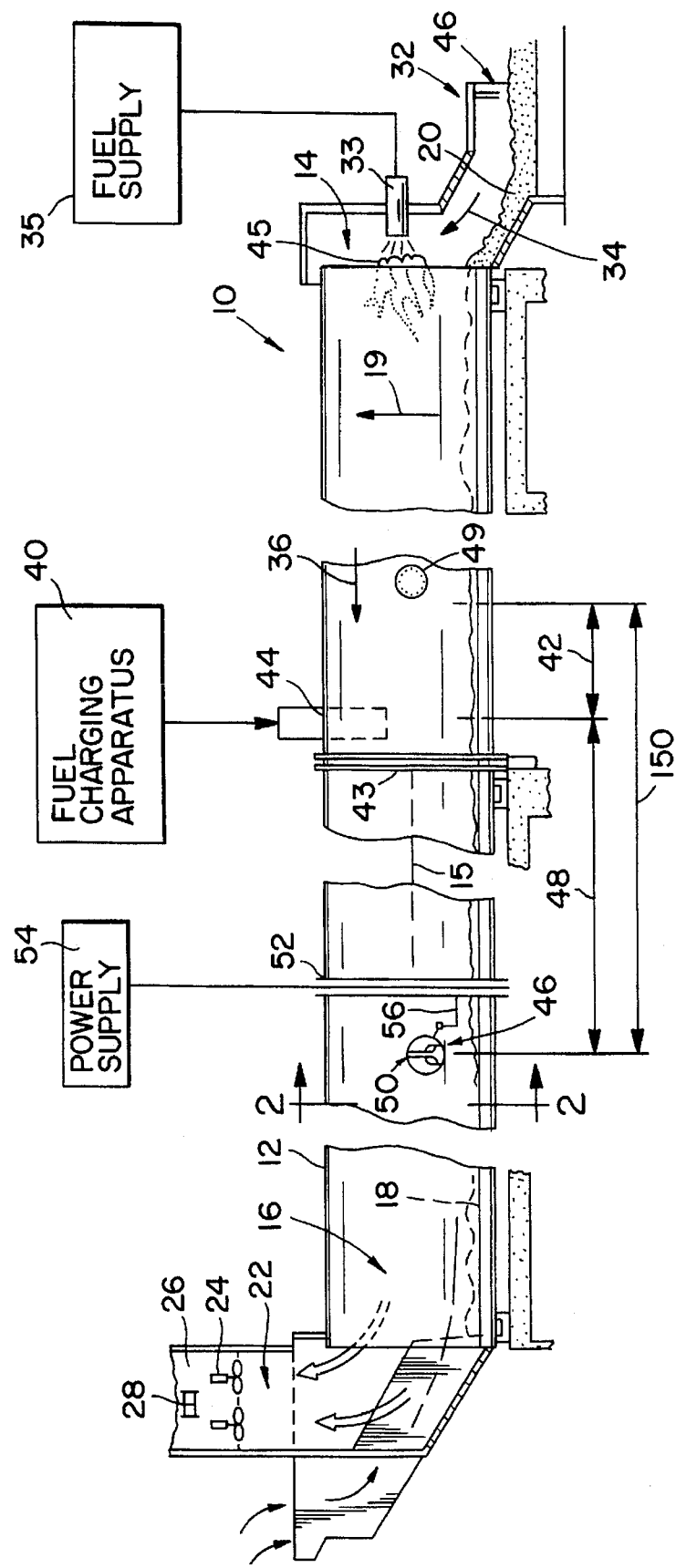
FIG. 1 is a diagrammatical view of an improved long rotary kiln in accordance with the present invention showing mineral flow in a downhill direction through the drying, calcining, and clinkering zones in a rotary vessel, a fuel charging apparatus for charging a supplemental fuel into a secondary burning zone of the kiln, an air entry port formed in the kiln downstream relative to kiln gas flow from the fuel charging apparatus, and a fan coupled to the air entry port for supplying tertiary air to the kiln.

FIG. 1 illustrates a conventional long, dry and/or wet process kiln 10, including a kiln cylinder or rotary vessel 12 having a lower fired end 14 and an upper end 16. Mineral material 18 is charged to upper end 16 of rotary vessel 12. Rotary vessel 12 is typically 10–15 feet or more in diameter and 400–700 feet in length and is inclined so that as rotary vessel 12 is rotated about its longitudinal axis 15 at a rate of about 1 to 3 times per minute in the direction of arrow 19, raw mineral material 18 fed into upper end 16 of rotary vessel 12 moves toward the lower fired end 14 where the final clinkering process takes place. The configuration of the elements of the mineral feed components and the kiln gas processing components at the upper end 16 of rotary vessel 12 are well known to those skilled in the art and it should be appreciated that such elements are shown diagrammatically in FIG. 1 to illustrate their relationship and cooperation in operation of rotary kiln 10. It will be understood that any of a wide variety of mineral loading and kiln gas handling systems may be incorporated into the kilns modified in accordance with the present invention.

Product clinker 20 is discharged from fired end 14 for cooling and subsequent processing. Temperatures in the fired clinkering zone of rotary vessel 12 range from about 1300° C. to about 1600° C. Gas temperatures in the kiln decrease to as low as 250°–350° C. at upper end 16 of so-called wet process kilns. Somewhat higher gas temperatures exist in the upper end 16 of dry process kilns.

Exhaust gases from kiln 10 may be treated to remove particulates at an emission control station 22 utilizing bag filters or electrostatic precipitators (not shown). The flow of gases through rotary vessel 12 is controlled by blowers 24 which direct the exhaust gases through stack 26. A continuous emissions monitoring (CEM) system 28 is provided in stack 26 to monitor the amount of solid materials discharged into the atmosphere. Continuous emissions monitoring system 28 can discontinue firing of kiln 10 with hazardous waste if the amount of hazardous materials discharged through stack 26 exceeds regulatory limits. Kiln 10 may also be equipped with a kiln gas bypass apparatus (not shown) such as the bypass apparatus disclosed in U.S. patent application Ser. No. 07/913,587, owned by the assignees of the present invention and incorporated herein by reference.

Fuel from a fuel supply 35 is combined with primary combustion air and burned using burner 33. Secondary combustion air is pre-heated as it is drawn through cooling chamber 32 in the direction of arrow 34. The hot kiln gas stream illustrated by arrow 36 which is generated by fuel combustion at burner 33 in the clinkering zone flows in a downstream direction from lower fired end 14 toward upper end 16 of rotary vessel 12.

As shown diagrammatically in FIG. 1, in one preferred embodiment of the present invention, a fuel charging apparatus 40 is provided for charging a supplemental fuel into a secondary burning zone 42 of rotary vessel 12. The supplemental fuel may be a natural fossil fuel such as lump coal or a waste derived fuel. A thermocouple 43 is located about 10 to about 50 feet toward upper end 16 of kiln 10 from charging apparatus 40 to monitor the kiln gas temperature inside rotary vessel 12. The solid fuel is typically charged into the calcinating zone or into a downstream portion relative to kiln gas flow of the clinkering zone through a solid fuel charging port 44 formed in the rotary vessel 12. Methods and apparatus for modification of long kilns for burning supplemental fuel or solid waste derived fuel in operating cement kilns are described in U.S. Pat. Nos. 4,850,290; 4,930,965; 5,078,594, and 5,083,516 as discussed above. U.S. Pat. No. 5,257,586 discloses a method and apparatus for charging supplemental fuel such as lump coal into a rotary vessel.

It is understood that other charging systems can be used for charging waste materials into the kiln to provide supplemental fuel. For instance, tires can be charged into the kiln using an apparatus disclosed in U.S. Pat. No. 5,078,594, the specification of which is incorporated herein by reference. In addition, more than one fuel transfer assembly can be provided so that more than one container or other solid waste can be charged into the rotary vessel 12 during each revolution of kiln cylinder 12. This system is described in U.S. Pat. No. 5,339,751 which is incorporated herein by reference. In addition, solid waste derived fuel can be fired from an industrial cannon mounted at the lower fired end of the kiln into the secondary burning zone of the kiln as illustrated in U.S. Pat. Nos. 5,086,716 and 4,984,983.

As the supplemental fuel is charged into the kiln, burning of the supplemental fuel occurs in secondary burning zone 42. This burning of a supplemental fuel in kiln 10 reduces the fuel consumption required by burner 33. It is important that total combustion of the waste derived fuel or other supplemental fuel occurs in order to prevent discharge of solid materials into the atmosphere and to reduce the amount of carbon monoxide discharged into the atmosphere. Carbon monoxide results from incomplete combustion.

It is desirable to replace as much of the fuel for firing burner 33 as possible with a supplemental fuel such as solid waste materials charged through charging apparatus 40. Specifically, it is desirable to replace at least 10% of the required primary kiln fuel with the supplemental fuel charged through charging apparatus 40. In order for the required quantities of waste derived fuel to have complete combustion, an optimum oxygen content in the kiln gas stream at mid-kiln is about 6% or higher. Typically, however, the oxygen level in the kiln gas stream at mid-kiln is only about 1%.

A large volume of air is drawn through air inlet opening at the discharge end of kiln 10 as illustrated by arrow 34. Air drawn through the inlet opening contains about 20% oxygen and 80% nitrogen. Incoming air mixes with fuel and primary combustion air at the lower end 14 of rotary vessel 12 to produce flame 45 in a primary combustion zone. The oxygen level of kiln gas downstream relative to kiln gas flow from the primary combustion zone is rather low, due to the primary combustion which uses oxygen and due to the increased volume of combustion products from the fuel used to generate flame 45.

One method to increase the oxygen level available adjacent the secondary burning zone 42 of kiln 10 is to increase the quantity of air drawn through inlet opening 46. However, increasing the volume of air drawn into lower end 14 of kiln 10 would reduce the temperature of flame 45, thereby disrupting the thermal profile of flame 45.

The present invention advantageously increases the oxygen level adjacent the secondary firing zone 42 of kiln 10 without disturbing the thermal profile of flame 45. To accomplish this objective, rotary vessel 12 includes an air entry port 46 located downstream relative to kiln gas flow from secondary burning zone 42. In the FIG. 1 embodiment, air entry port 46 is spaced apart from fuel charging port 44 by a distance 48. Distance 48 is preferably about 20 feet to about 100 feet. Thermocouple 43 may be located downstream relative to kiln gas flow from air entry port 46. It is understood that additional air entry ports may be provided, if required, and that one or more air entry ports may be formed at different angular positions in rotary vessel 12.

An air entry port 46 may also be formed in rotary vessel 12 upstream relative to kiln gas flow relative to the secondary burning zone 42 to supply oxygen to the secondary burning zone 42. In this instance, the kiln gas stream moving in the direction of arrow 38 transports the injected air to secondary burning zone 42, thereby increasing the oxygen level in the secondary burning zone 42.

A fan 50 is coupled to rotary vessel 12 in air flow communication with air entry port 46. In FIG. 1, fan 50 is mounted on rotary vessel 12 in air flow communication with air entry port 46 to supply tertiary or mixing air into the rotary vessel 12. Preferably, fan 50 is a 75 horsepower fan.

A circumferential contact ring 52 is also mounted on rotary vessel 12. Contact ring 52 is coupled to a power supply 54 by, for example, a stationary contact (not shown) which engages the contact ring 52 as rotary vessel 12 rotates. Contact ring 52 is coupled to fan 50 by a suitable electrical connectors 56.

Figure 2:
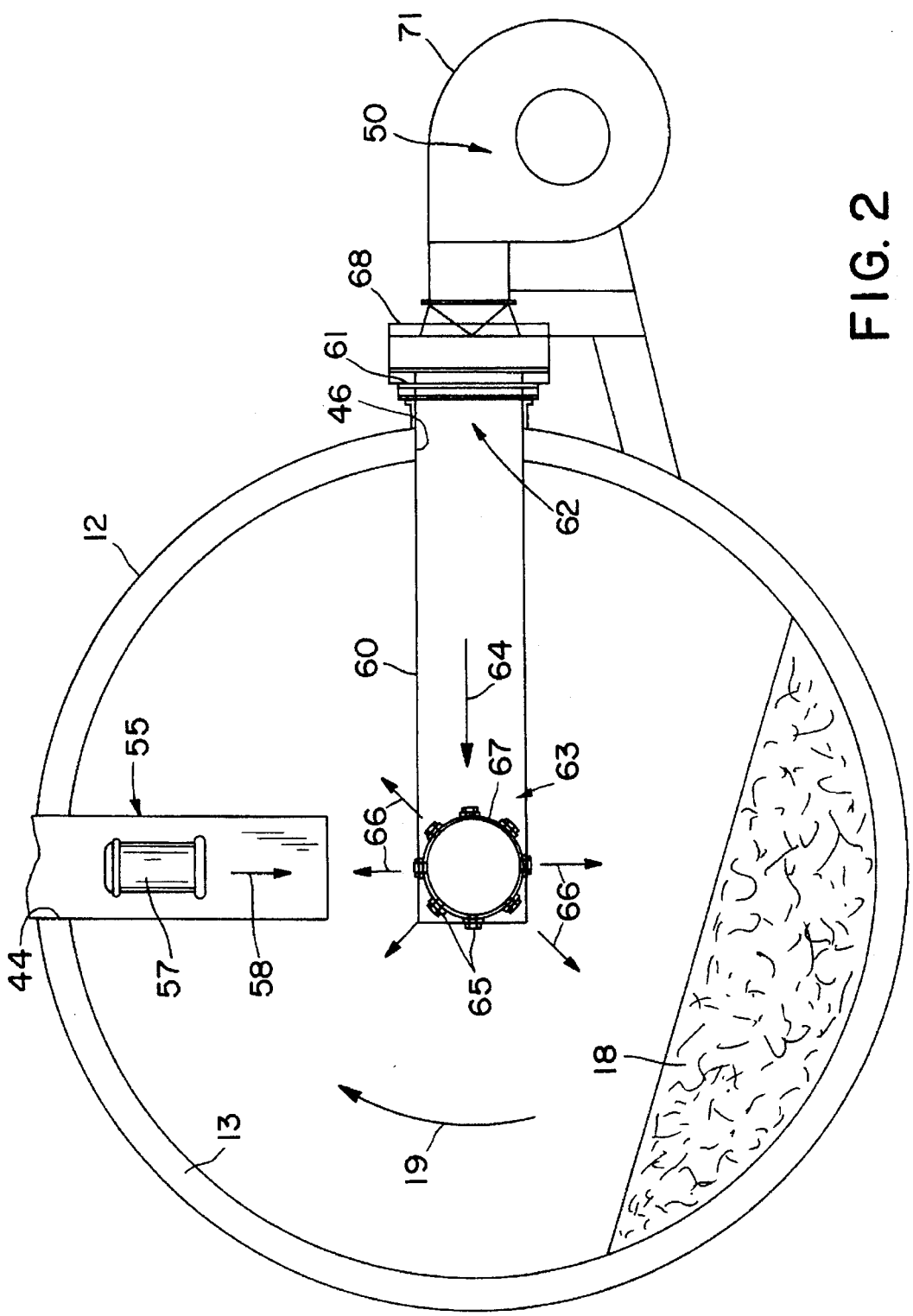
FIG. 2 is a sectional view taken along lines 2—2 of FIG. 1 with a fuel charging port aligned at top dead center illustrating details of one embodiment of an air injection tube coupled to air entry port, the air injection tube including a plurality of angularly spaced nozzles for injecting air into the kiln gas stream at multiple angles relative to a longitudinal axis of rotation of the kiln.

FIG. 2 further illustrates the configuration of the tertiary or mixing air supply apparatus of the present invention. A refractory liner 13 is provided on an interior surface of rotary vessel 12. FIG. 2 illustrates a conventional drop tube 55 coupled to rotary vessel 12 in communication with fuel charging port 44. Drop tube 55 prevents in-process mineral material 18 from escaping through fuel charging port 44 during rotation of rotary vessel 12 in the direction of arrow 19. Waste derived fuel 57 or other supplemental fuel such as lump coal or the like is charged through drop tube 55 in the direction of arrow 58 using a conventional fuel charging apparatus 40 as discussed above. It is understood, however, that any apparatus or method for delivering a supplemental fuel to the secondary burning zone 42 may be used in accordance with the present invention.

The air supply apparatus of the present invention includes an air injection tube 60 coupled to rotary vessel 12 in air flow communication with air entry port 46. Air injection tube 60 includes a flange 61 coupled to an air inlet end 62 of tube 60. Tube 60 also includes an air discharge end 63 extending into the rotary vessel 12. Air from fan 50 is forced into rotary vessel 12 in the direction of arrow 64 and exits air discharge end 63 of inlet tube 60 through a plurality of radially or angularly spaced air injection nozzles 65 located around the outer periphery of extension Section 67. Advantageously, air is injected from each nozzle 65 at a different angle or direction as illustrated by representative arrows 66. Therefore, the injected air is directed into the kiln gas stream 38 at multiple angles relative to the longitudinal axis of rotation 15 of the rotary vessel 12.

Air is injected into the kiln gas stream at a selected velocity to mix the injected air rapidly with the kiln gas stream. Air is injected from nozzles 65 at a linear flow rate of at least 100 feet per second to mix the injected air with the kiln gas stream 38. Preferably, air is injected at 200-500 feet per second. Fan 50 is located within a cartridge housing 71 having a flange 68 coupled to flange 61 of inlet tube 60. Air injection tube 60 extends into rotary vessel 12 a predetermined distance beyond the maximum depth of the in-process mineral material 18 to prevent the in-process mineral material 18 from escaping through air entry port 46. Flow of tertiary air through air injection tube 60 cools tube 60 to increase its life. The constant positive pressure also prevents the loss of any fugitive dust during kiln operation.

Mixing of the cool tertiary air supplied by fan 50 with kiln gases is extremely fast because of the high velocity of the kiln gas stream in the direction of arrow 38 and the high velocity of the tertiary air stream injected from nozzles 65 the directions of arrows 66. In addition, the tertiary air entering rotary vessel 12 will expand rapidly when changing from ambient temperature to kiln temperature.

Figure 3:
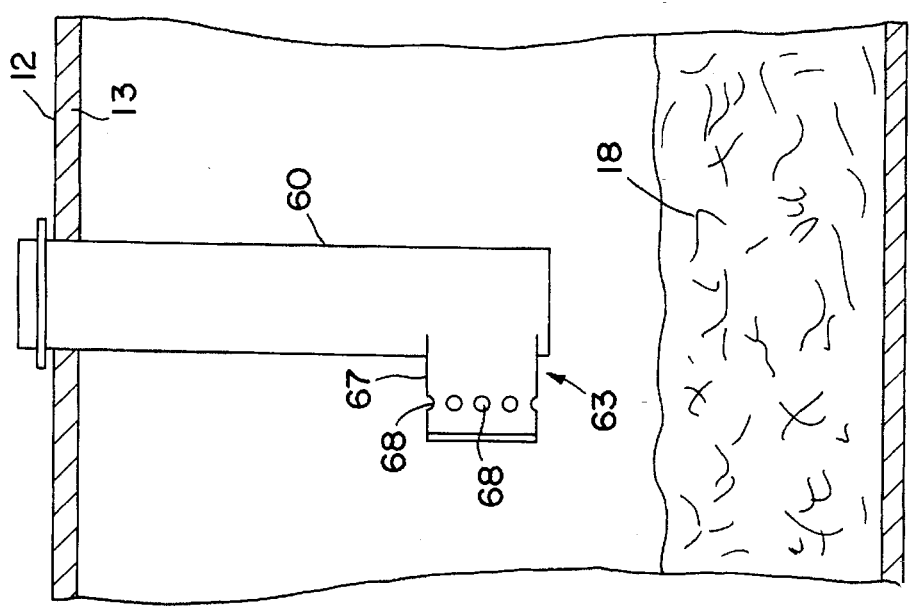
FIG. 3 is a sectional view illustrating another embodiment of the air injection tube of the present invention.

As illustrated in FIG. 3, air injection tube 60 includes an extension section 67 adjacent discharge end 63. Extension section 67 is aligned at about 90° relative to a longitudinal axis of air injection tube 60. Extension section 67 is formed to include a plurality of apertures 68 therein. Apertures 68 are angularly spaced about the periphery of extension section 67. In the illustrated embodiment, eight apertures 68 are provided with each aperture 68 being separated from an adjacent aperture 68 by an angle of about 45 degrees as best illustrated by angle 95 in FIG. 4. It is understood, however, that a different number of apertures 68 may be used depending upon the desired application. As illustrated in FIG. 3, the air injection tube 60 may be used without nozzles 65 mounted in apertures 68. In this instance, the flow rate of air through apertures 68 is controlled by adjusting the speed of fan 50. Preferably, apertures 68 have a diameter of about 2.5 inches.

Figure 4:
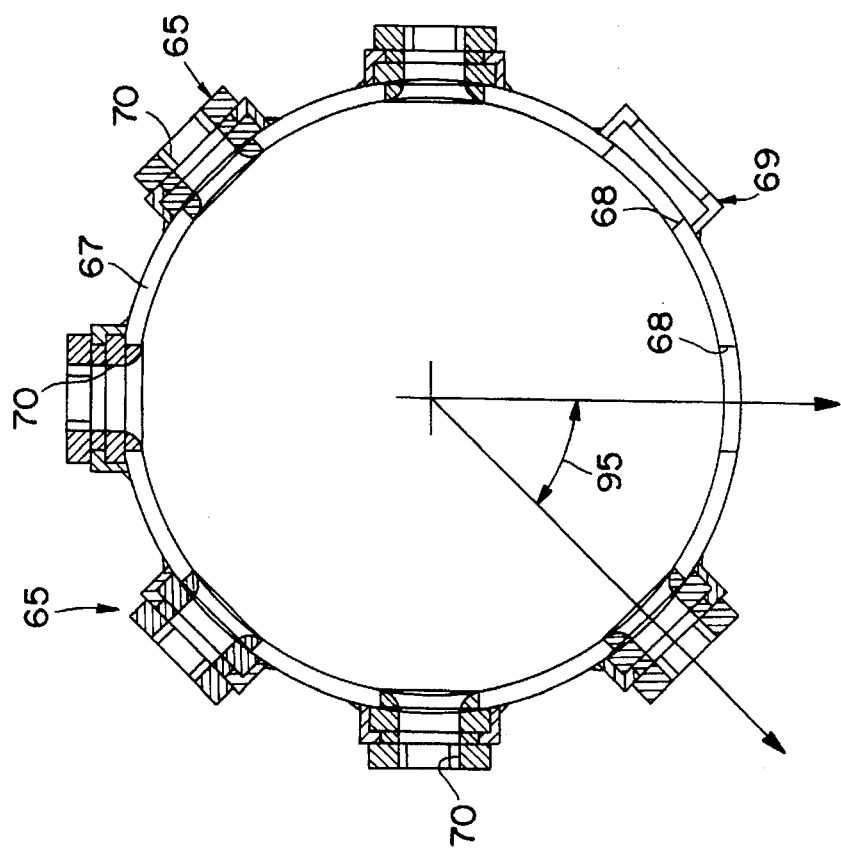
FIG. 4 is a sectional view taken through an air discharge end of the air injection tube of FIG. 2 illustrating the configuration of nozzle holders and nozzles coupled to apertures formed in the air discharge end of the air injection tube.

Preferably, however, nozzles 65 are installed into apertures 68. FIG. 4 illustrates the configuration of nozzles 65 installed within apertures 68 of extension section 67. Nozzles 65 are held in air flow communication with apertures 68 by nozzle holders 69. In order to install the nozzles 65 in extension section 67, the nozzles 65 are first inserted into a nozzle holder 69. The nozzle 65 is then used as a pilot to align the nozzle holder 69 with a selected aperture 68. The thus aligned nozzle holder 69 is then tack welded into position on extension section 67. Nozzles 65 are then removed and the nozzle holders 69 are welded to seal the nozzle holders 69 on the extension section 67. After nozzle holders 69 are welded, nozzles 65 are reinserted into the nozzle holders 69. Nozzles 65 are twisted into place within nozzle holders 69. Nozzles 65 are then tack welded to the nozzle holders 69 at two positions about 180° apart to hold nozzles 65 within nozzle holders 69. Nozzles 65 include an internal orifice 70. The size of orifice 70 controls the linear flow rate of air through nozzles 65. Therefore, nozzles 65 having a smaller orifice 70 can be inserted into nozzle holders 69 if it is desired to increase the linear flow rate of air through nozzles 65. In the preferred embodiment, nozzles 65 have an orifice 70 sized to provide a linear flow rate of air through nozzles 65 of at least 100 feet per second to provide cross sectional mixing of the injected air with the kiln gas stream. Preferably, the linear flow rate of air through nozzles 65 is about 200 feet per second to about 500 feet per second.

By arranging a plurality of angularly spaced nozzles 65 in extension section 67, the present ensures that at least a portion of the injected air is constantly directed toward the bed of in-process mineral material 18. This directional diffusing and mixing of the injected air maximizes cross sectional homogeneity by mixing the injected air with the kiln gas stream.

Figure 6:
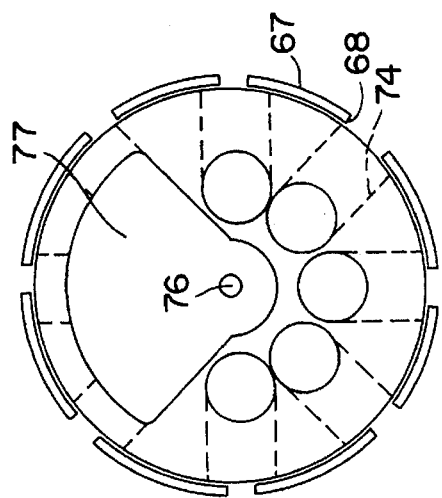
FIG. 6 is a sectional view taken along lines 6—6 of FIG. 5 illustrating details of the rotary valve of FIG. 5.
Figure 5:
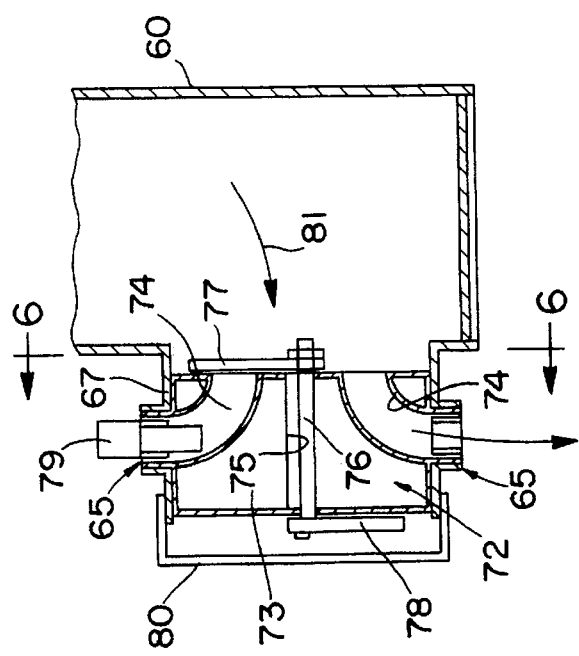
FIG. 5 is a sectional view illustrating another embodiment of the present invention which includes a gravity controlled rotary valve coupled to the air discharge end of the air injection tube to direct the discharged air downwardly toward the bed of in-process mineral material at all times during kiln rotation.

Another embodiment of the present invention is illustrated in FIGS. 5 and 6. In this embodiment, a gravity controlled rotary valve 72 is installed in extension section 67 of air injection tube 60. The rotary valve 72 is provided to direct the injected air stream continuously downwardly toward the bed of in-process mineral material 18. Rotary valve 72 includes a stationary valve body 73 formed to include a plurality of passageways 74. A passageway 74 is aligned with each aperture 68 formed in extension section 67 of air injection tube 60. Stationary valve body 73 also includes a central bore 75 for receiving a rotating shaft 76 therein. A plate 77 is rigidly coupled to shaft 76. A weight 78 is rigidly coupled to an opposite end of shaft 76. Weight 78 extends away from shaft 76 in a direction opposite from plate 77 and has a weight greater than the weight of plate 77 so that the weight 78 is continuously directed downwardly due to gravity as the rotary vessel 12 of kiln 10 rotates. Therefore, plate 77 is continuously directed upwardly to block selected passageways 74 positioned in an upwardly directed portion of valve body 72. Advantageously, rotary valve 72 therefore continuously directs most of the injected air downwardly toward the bed of in-process mineral material 18.

In order to install rotary valve 72 into extension section 67, an end wall of extension section 67 is first removed. Rotary valve 72 is then inserted into the open end of extension section 67. A pilot 79 is inserted through a selected nozzle 65 and into a passageway 74 corresponding to the selected nozzle 65 to align each aperture 68 formed in extension section 67 with a corresponding passageway 74. Preferably, two pilots 79 are used as alignment tools in nozzles 65 located 180° apart. After the pilots 79 are seated in the passageways 74, valve assembly 72 is welded into the interior of extension section 67 of tube 60. An end cap 80 is then positioned over the open end of extension section 67 and welded into place.

As illustrated in FIG. 6, plate 77 advantageously blocks air flow into the upwardly directed passageways 74. Weight 78 causes shaft 76 to rotate and maintain plate 77 in an upwardly directed position at all times during rotation of rotary vessel 12. As illustrated in FIG. 5, the diameter of shaft 76 is smaller than the internal diameter of the central bore 75 formed in valve body 73. Pressure within air injection tube 60 in the direction of arrow 81 tends to hold the plate 77 against valve body 73 to provide a seal therebetween. Therefore, air is only injected into the kiln 10 through the lower five passageways 74 as illustrated in FIG. 6. Accordingly, the air is injected into the lower half of the rotary vessel 12, and is mainly directed downwardly toward the bed of in-process mineral material 18. In FIG. 6, nozzles 65 are not coupled to apertures 68 formed in extension section 67. Therefore, rotary valve 72 may be used with or without nozzles 65.

Figure 7:
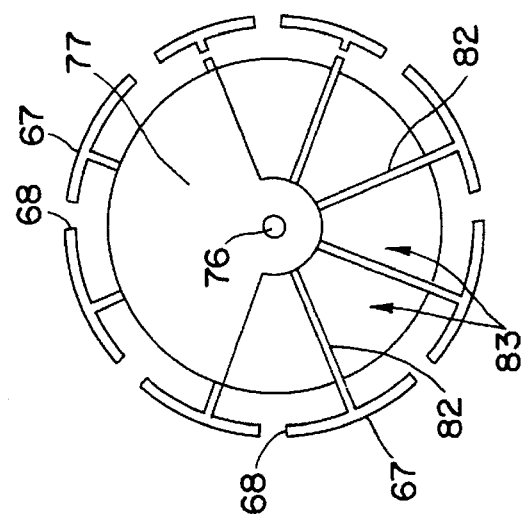
FIG. 7 is a sectional view similar to FIG. 6 illustrating details of another embodiment of the rotary valve.

FIG. 7 illustrates another embodiment of the rotary valve of the present invention. In this embodiment, a plurality of dividing walls 82 are provided instead of passageways 74. Plate 77 therefore blocks air flow into the upwardly directed air flow regions 83 formed between adjacent dividing walls 82 of the valve body so that most of the injected air is directed downwardly toward the bed of in-process mineral material 18.

Figure 9:
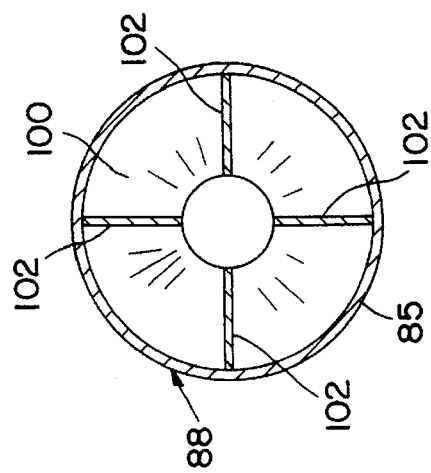
FIG. 9 is a sectional view taken along lines 9—9 of FIG. 8 further illustrating the configuration of the deflector.
Figure 8:
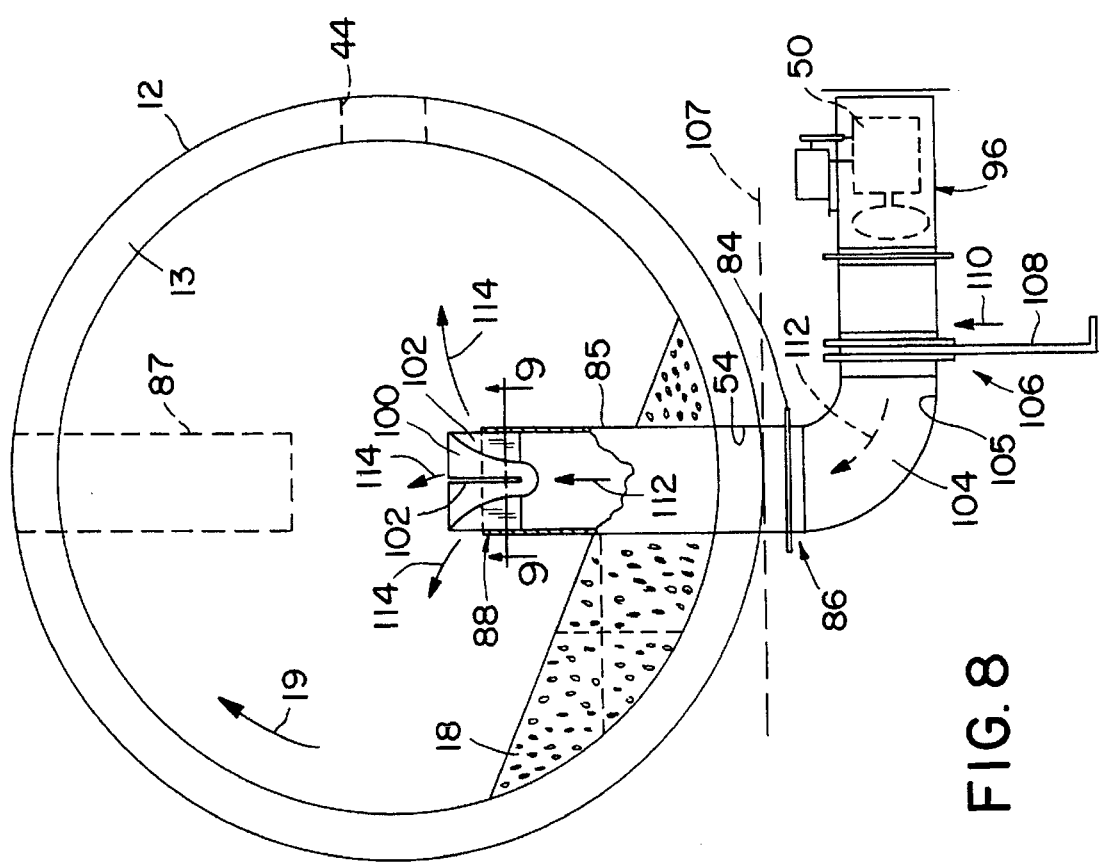
FIG. 8 is a sectional view with portions broken away illustrating another embodiment of the present invention which includes a deflector coupled to a discharge end of the air injection tube located inside the rotary vessel for dispersing injected air flowing through the air injection tube, a curved tube section coupled to the inlet tube, and a tube-mounted slide gate for containing mineral material escaping through the air entry port and for returning the mineral material to the kiln during rotation of the rotary vessel.

Another embodiment of the present invention is illustrated in FIG. 8. Those numbers referenced by numbers in FIGS. 1–7 provide the same or similar functions. In the FIG. 8 embodiment, a deflector 100 is coupled to an air discharge end 88 of air injection tube 85. Deflector 100 is coupled to tube 85 by partitions 102 which extend between deflector 100 and tube 85. The configuration of deflector 100 and partitions 102 is further illustrated in FIG. 9.

A curved tube section 104 is coupled to flange 84 at inlet end 86 of inlet tube 85. Tube section 104 includes a portion 105 aligned generally parallel to a tangent (illustrated by dotted line 107) to rotary vessel 12. A slide gate assembly 106 is coupled to a second end of curved tube section 104. Slide gate assembly 106 includes a movable slide gate 108 capable of movement in the direction of arrow 110 to seal the second end of curved tube section 104. Curved tube section 104 and slide gate assembly 106 provide means for containing in-process mineral material 18 escaping through air entry port 54 and for returning said in-process mineral material 18 to the rotary vessel 12 during rotation of rotary vessel in the direction of arrow 19.

Fan 50 located in cartridge housing 96 is coupled to slide gate assembly 106 in air flow communication with curved tube section 104 and inlet tube 85. Power is coupled to fan 50 in the same way that power is coupled to fan 50 in FIG. 1. Fan 50 forces air in the direction of arrows 112 through curved tube section 104 and inlet tube 85. Air is deflected by deflector 100 at multiple angles relative to a longitudinal axis of inlet tube 85 in the direction of arrows 114. Deflection of the tertiary air away from air discharge end 88 of inlet tube 85 in the direction of arrows 114 advantageously improves mixing of the injected air with the kiln gas stream. In addition, dispersion of the tertiary air prevents cooling of the refractory liner 13 on an opposite side of rotary vessel from air inlet tube 85.

If desired, another inlet tube 85 may be coupled to rotary vessel 12 diametrically opposed from inlet tube 85 as illustrated by the dotted line 87 in FIG. 8. This second inlet tube 87 is axially aligned with inlet tube 85. In this embodiment, deflector 100 may be omitted. When diametrically opposed inlet tubes 85 and 87 are used, the injected air streams from the opposed inlet tubes 85 and 87 collide to disperse the tertiary air within rotary vessel 12.

Figure 10:
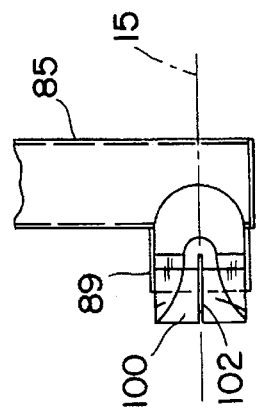
FIG. 10 is a sectional View illustrating another embodiment of the deflector coupled to an extension section of the discharge end of the air injection tube to disperse air at multiple angles relative to the longitudinal axis of rotation of the rotary vessel.

Deflector 100 may also be aligned with longitudinal axis of rotation 15 of rotary vessel 12 as illustrated in FIG. 10. In this embodiment, deflector 100 is coupled to an extension section 89 of air injection tube 85 in the same manner discussed above with reference to FIGS. 8 and 9.

Figure 12:
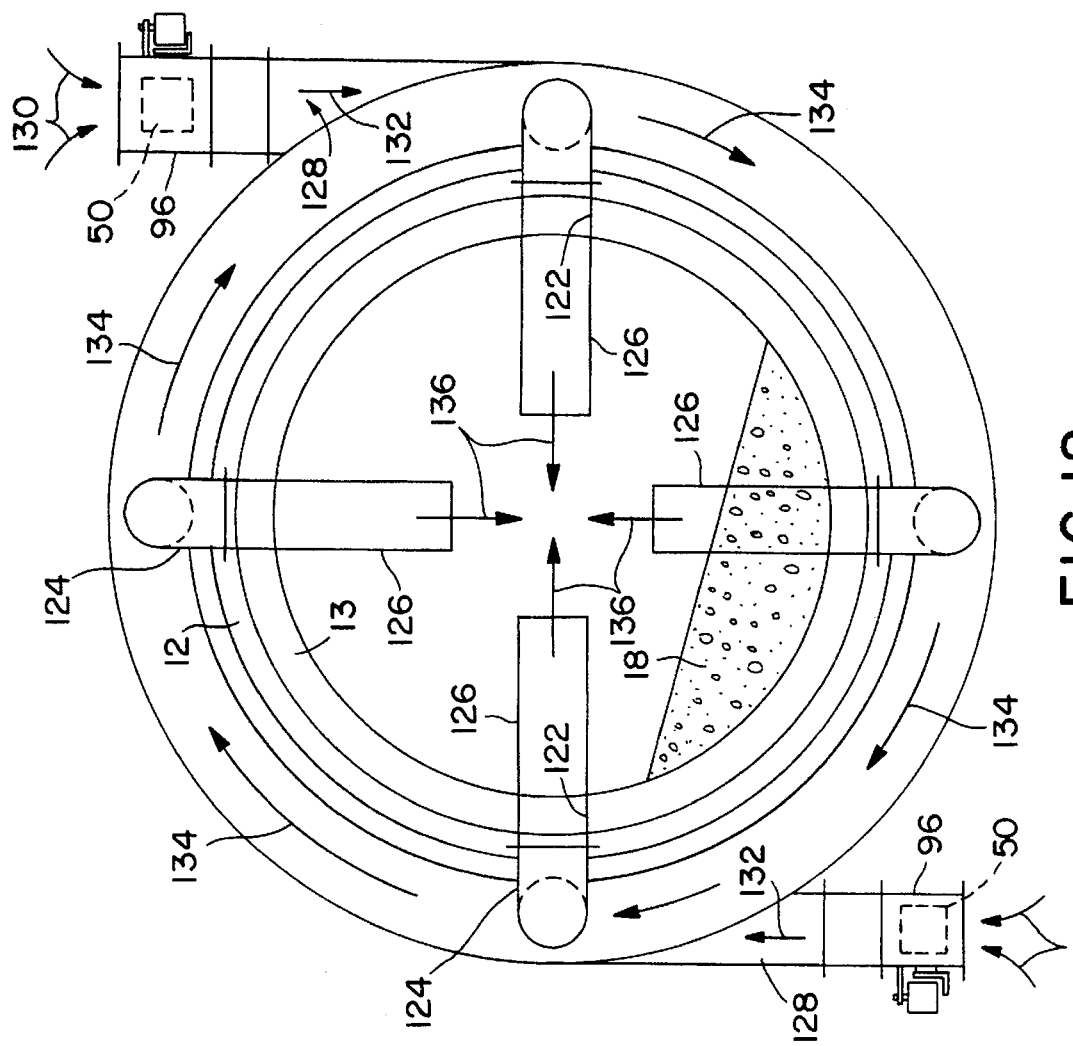
FIG. 12 is a sectional view further illustrating the embodiment illustrated in FIG. 11.
Figure 11:
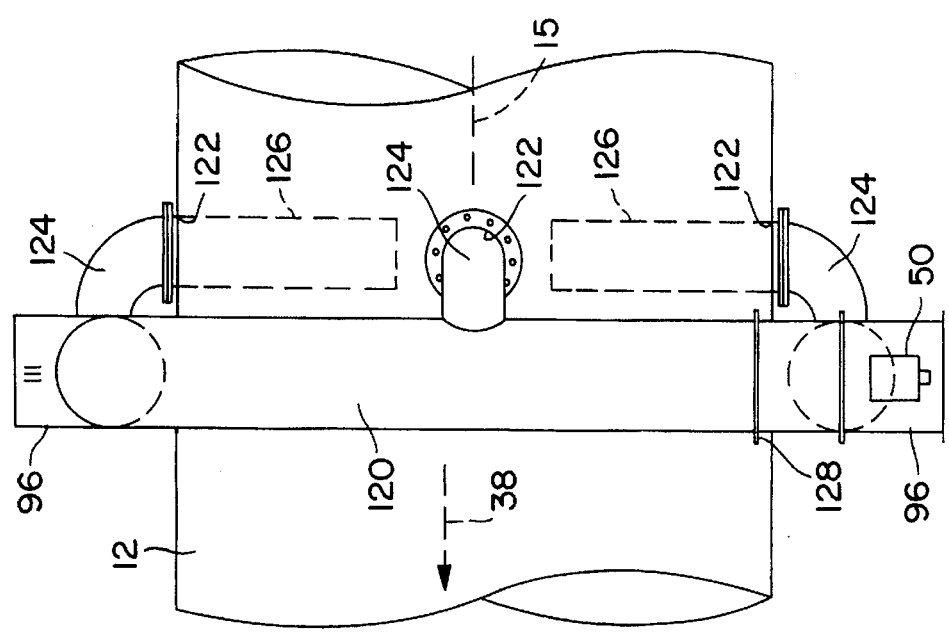
FIG. 11 is a partial elevational view illustrating another embodiment of a air supply apparatus of the present invention including a circumferential air supply duct mounted on the rotary vessel, a plurality of angularly spaced air entry ports formed in the rotary vessel, and tube sections for coupling to air entry ports in air flow communication with the air supply duct.

Another embodiment of the present invention is illustrated in FIGS. 11 and 12. In this embodiment, a circumferential air supply duct 120 is coupled to rotary vessel 12. A plurality of angularly spaced air supply ports 122 are formed in rotary vessel 12. Tubes 124 are coupled between air supply duct 120 and air entry ports 122 to provide air flow communication between air supply duct 120 and air entry ports 122. Air injection tubes 126 are coupled to rotary vessel 12 in air flow communication with air entry ports 122 to provide means for preventing in-process mineral material 18 from escaping through air entry ports 122. Variable speed fans 50 are located inside cartridge housings 96. Housings 96 are coupled in air flow communication with air supply duct 120 by tube sections 128.

Fans 50 are connected to a power supply in the same manner that fan 50 in FIG. 1 is connected to power supply 54. Ambient tertiary air is pulled through fans in the direction of arrows 130. Fans force tertiary air through tube sections 128 in the direction of arrows 132, and into air supply duct 120 as illustrated by arrows 134. Air circulating inside air supply duct 120 in the direction of arrows 134 enters connection tubes 124 and moves through air injection tubes 126 and into rotary vessel 12 in the direction of arrows 136. In some instances, a single fan 50 may be capable of supplying enough tertiary air to the inside of rotary vessel 12. Therefore, the second fan 50 may be omitted from FIGS. 11 and 12. In addition, selected air entry ports 122 can be uncoupled from air supply duct 120 and sealed with refractory lined covers if desired. Nozzles (not shown) may also be used in tubes 126 to control the amount of injected air and the speed of the injected air. The injected air streams from tubes 126 collide to disperse the injected air at multiple angles relative to a longitudinal axis of rotation 15 of rotary vessel 12.

Figure 13:
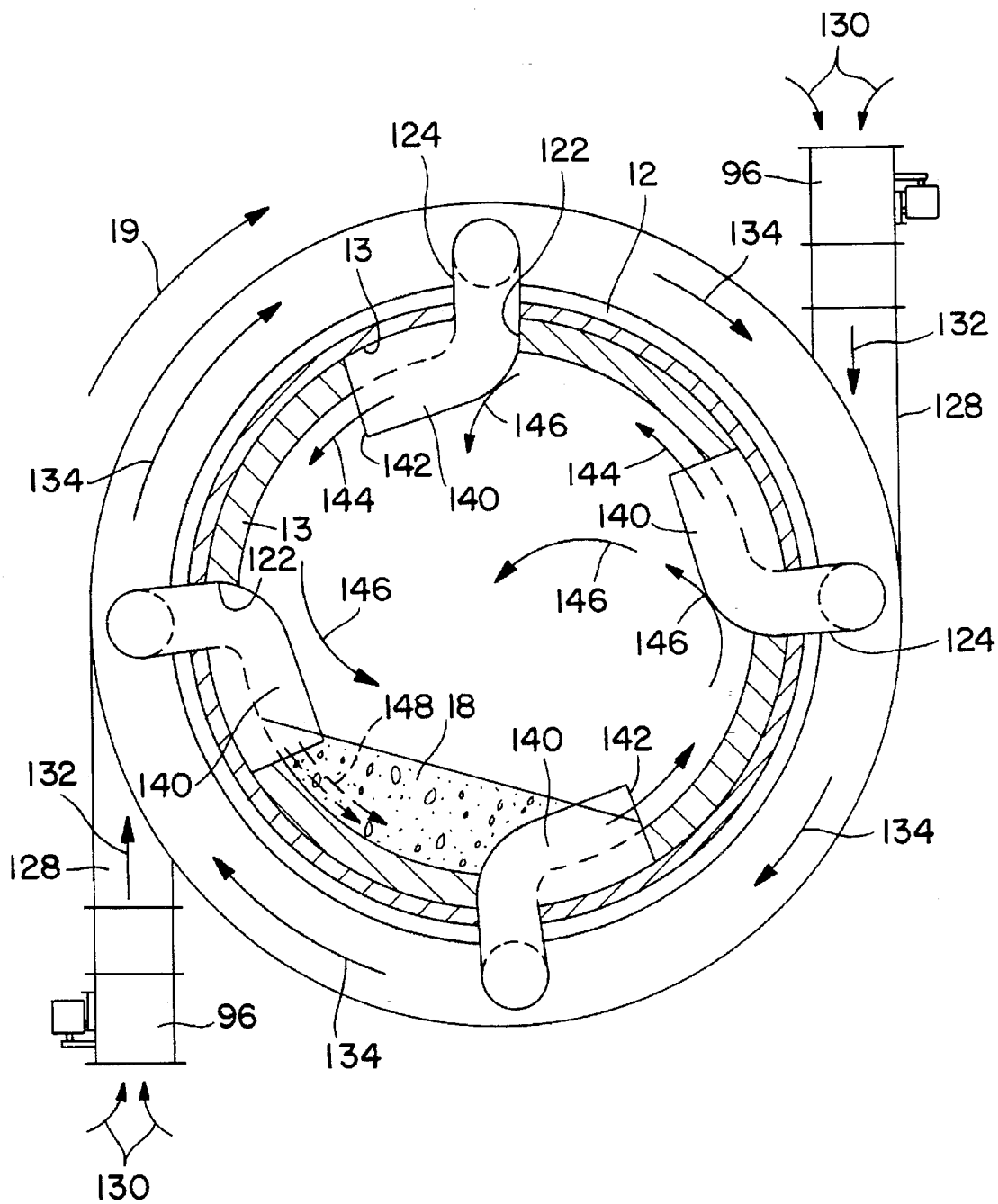
FIG. 13 is a sectional view of another embodiment of the present invention similar to the embodiment illustrated in FIGS. 11 and 12, in which the air injection tubes are configured to impart rotational momentum to the injected air to improve mixing of the injected air with the kiln gas stream and to inject air beneath the mineral material bed inside the kiln during rotation of the rotary vessel.

FIG. 13 illustrates another embodiment of the present invention. In FIG. 13, those numbers referenced by numbers identical to FIGS. 1–12 perform the same or similar function. The FIG. 13 embodiment includes air supply duct 120 mounted on rotary vessel 12 and fans 50 coupled to air supply duct 120 by tube sections 128. Air supply duct 120 is coupled in air flow communication with air entry ports 122 by tube sections 124. However, in the FIG. 13 embodiment, inlet tubes 140 are aligned at an angle so that the discharge ends 142 of inlet tubes 140 are located adjacent the refractory liner 13 of rotary vessel 12. Discharge ends 142 open in a direction opposite to the direction of rotation of rotary vessel 12 illustrated by arrow 19 so that mineral material 18 does not fill inlet tubes 140 during kiln rotation.

Air circulating through air supply duct 120 in the direction of arrows 134 enters inlet tubes 140 and exits air discharge ends 142 of inlet tubes 140 in the direction of arrows 144, generally tangential to an inner wall of the rotary vessel 12. Air continues to circulate within rotary vessel in the direction of arrows 146. As rotary vessel 12 rotates in the direction of arrow 19, tertiary air is also advantageously injected beneath the bed of in-process mineral material 18 by the inlet tube moving beneath the mineral material 18 as illustrated by arrow 148. The FIG. 13 embodiment advantageously supplies tertiary air and increases the oxygen level beneath the mineral material bed. The FIG. 13 embodiment may be used either upstream or downstream relative to kiln gas flow from secondary burning zone 42. When used upstream relative to kiln gas flow from the secondary burning zone 42, the FIG. 13 embodiment promotes complete combustion of any residual organic matter from waste derived fuel which might remain in mineral material 18 by both delivering air into the kiln gas stream and delivering air under the bed of in-process mineral material 18.

The injected air added to the kiln gas stream as illustrated by arrows 144 and 146 of FIG. 13 advantageously has rotational momentum about the longitudinal axis of rotation 15 of the rotary vessel 12. Such rotational momentum of the injected air improves cross sectional mixing of the injected air with the kiln gas stream. Nozzles may be used within the air injection tubes 140 to control the flow rate of injected air and further promote cross sectional mixing of the injected air with the kiln gas stream.

The speed of fans 50 of the present invention can be controlled by a signal from a sensor located upstream from secondary burning zone 42 for monitoring the kiln gas stream. CEM 28 can be used, or another sensor (not shown) can be mounted in rotary vessel 12 upstream from secondary burning zone 42. The sensor monitors emissions in the kiln gas stream and controls the amount of tertiary air supplied by fans based on the emission levels.

It is understood that any of the air injection apparatus disclosed herein may also be used upstream (downhill) from the secondary burning zone to improve the combustion efficiency of the supplemental fuel within the kiln, thereby reducing kiln emissions and at the same time to increasing the capacity for burning waste derived fuels. When waste derived fuel is charged into the kiln at a mid-kiln secondary burning zone, sufficient oxygen levels must be supplied near the secondary burning zone to promote complete combustion of the waste derived fuel. One method for increasing the oxygen level near the secondary burning zone of the kiln is to increase the amount of secondary air drawn into the kiln through the lower fired end of the kiln. However, additional secondary air drawn through the lower fired end has an adverse cooling effect on the primary burner flame. Such alters the thermal profile of the burner flame and the cement making process and results directly in reduced clinker production. An air injection apparatus of FIGS. 1–13 may be used to increase oxygen levels in the secondary burning zone without disrupting the thermal profile of the burner flame.

Nitrogen oxides are one group of air pollutants which have been targeted by state and federal air quality regulations for increasingly stringent controls. Nitrogen oxides, often referred to by the symbol $NO_x$, include both nitric oxide (NO) and nitrogen dioxide ($NO_2$). Nitric oxide and nitrogen dioxide are both produced during high temperature combustion such as that used in the manufacture of cement. Upon release into the atmosphere, nitrogen oxides mix with water vapor to form nitrous and nitric acid. At high concentrations, these acids contribute to formation of smog and acid rain. One object of the present invention is to provide a method for reducing the quantity of nitrogen oxides released into the atmosphere during the manufacture of cement in conventional long kilns.

To accomplish that objective, the present invention advantageously provides and allows control of combustion within the cement kiln 10. More particularly, in accordance with the present invention there is provided means for creating a reducing zone downstream of the clinkering zone and an oxidizing zone downstream of the reducing zone in the kiln to provide separate combustion stages. The temperatures of the kiln gas stream in the clinkering zone near the lower fired end 14 of kiln 10 is about 2400° F. to about 2900° F. The high temperature combustion in the clinkering zone generates high concentrations of nitrogen oxides among the combustion products in the kiln gas stream. The kiln gas stream moves downstream (uphill) in the direction of arrow 38 toward the upper end 16 of the kiln 10, typically at a linear flow rate of about 30 to about 40 feet per second.

Supplemental fuel is delivered to a secondary burning zone 42 downstream of the clinkering zone to create reducing conditions in the secondary burning zone 42. The term "secondary burning zone" refers to that length of the kiln downstream, relative to kiln gas flow, of the clinkering zone where supplemental fuel is burned, typically in contact with the mineral being processed in the kiln. Nitrogen oxides entrained in the oxygen depleted kiln gas stream moving through the secondary burning zone 42 helps support the oxidation/combustion of the supplemental fuel in the secondary burning zone 42. At least a portion of the nitrogen oxides in the kiln gas stream are reduced (i.e., they serve as an oxidizing agent) in the secondary burning zone 42, thereby depleting the concentration of nitrogen oxides in the kiln gas stream.

The length of the reducing zone, illustrated by dimension 150 in FIG. 1, corresponds generally to the length of the secondary burning zone 42 plus the length 48 from the air entry port 46 to the fuel charging apparatus (i.e., the point where the supplemental fuel contacts the in-process mineral) at the downstream end of the secondary burning zone 42. At the downstream end of the reducing zone 150, the selected air injection apparatus of the present invention (from FIGS. 1–13) is used to inject and mix air with the kiln gas stream to create an oxidizing zone. The length of the reducing zone 150 should be long enough to provide at least one-half second, preferably about 1 to about 3 seconds residence time for the kiln gas stream in the reducing zone 150. Thus the distance between the point of contact of the supplemental fuel with the in-process mineral in the kiln and the air injection point is at least a distance X where X is equal to (0.5 second)·R, and where R is the linear flow rate of the kiln gas stream in the rotary kiln vessel. That residence time assures optimum time for reduction of a major portion of the nitrogen oxides in the kiln gas stream. As mentioned above, the kiln gas stream typically has a linear velocity of about 30 to about 40 feet per second. Thus, the reducing zone 150 should be about 15–20 to about 120 feet long to provide time for nitrogen oxide conversion. The length of the reducing zone 150 can be adjusted either by repositioning the air injection port 46 or by increasing the length of the secondary burning zone 42, for example, by selecting a supplemental fuel with a prolonged burn time.

In one preferred embodiment of the invention means is provided to effect mixing of the kiln gas stream for, example, by promoting turbulence in the kiln gas stream as it passes through the reducing zone. This can be accomplished by installing a choker ring or dam ring in the rotary vessel at some point at or near the reducing zone to provide an axial length of reduced cross-sectional area for flow of the kiln gases. The induced turbulent flow promotes mixing of laminar portions of the kiln gas stream and helps promote exposure of a maximum portion of the $NO_x$-laden kiln gas stream with the gases released from the burning fuel in the reducing zone.

The air injection apparatus must be positioned at a location in the rotary vessel 12 at which the temperature of the kiln gas stream is at least above the minimum temperature required to burn (oxidize) carbon monoxide in the kiln gas stream, preferably above about 1600° F. Typically, the temperature of the kiln gas stream as it enters the chain system in the drying zone of the kiln is about 1,600° F. or less. Therefore, the air injection apparatus is typically located upstream (downhill) of the chain system. Preferably, the air injection apparatus is located about 20 feet to about 100 feet downstream relative to kiln gas flow from the upstream end of the secondary burning zone 42. It is important that the air injected into the kiln gas stream in a manner that optimize mixing of the injected air with the kiln gases before the temperature of the air-diluted kiln gas stream drops below a temperature sufficient to allow or promote oxidation of carbon monoxide and other products of incomplete combustion in the kiln gases at the point of air injection. In one embodiment of this invention, the air is injected in a manner which optimize cross-sectional homogeneity and dispersion of the injected air into the volume of kiln gas passing the air injection port. In another embodiment of the invention at least a portion of the injected air is continuously directed toward the in-process mineral during kiln rotation. The volume of the injected air is preferably kept to the minimum amount necessary to promote mixing of the passing kiln gases and mixing of itself with those gases to optimize cross-sectional homogeneity of the air-diluted kiln gas stream at or near the point of air injection without "quenching" the gas stream to a temperature below that necessary to attain oxidation of kiln gas components. The use of high air injection velocities and multi-directional injection promotes good mixing with a minimum volume of injected air. Preferably the volume of air injected in accordance with this invention is less than 10% of the total air required for stoichiometric burning of primary and secondary fuel in the kiln, more preferably less than 5% of the total air volume for stoichiometric burning. With injection of air downstream of the secondary burning zone in accordance with this invention, the volume of air introduced into the hot end of the kiln is reduced by about an equivalent volume. That reduces air ($O_2$) available to support burning in the secondary burning (reducing) zone. The kiln is operated in accordance with this invention so that near stoichiometric, most preferably slightly substichiometric conditions are maintained in the secondary burning zone. Excess oxygen can result in less effective $NO_x$ reduction while too little oxygen results in loss of heat values in the secondary burning zone.

The mixing of injected air with the kiln gas stream is enhanced in accordance with this invention by increasing the linear flow rate of the injected gas to at least 100 feet per second at its point of injection into the kiln gas stream and/or by directing said injected air into the kiln gas stream at multiple angles to the rotational axis of the rotary vessel or along multiple radians of that rotational axis. Preferably the air is injected into the kiln gas stream at multiple angles so that at least a portion of the injected air is always directed toward the in-process mineral during kiln rotation and as well, at a linear velocity of at least 100 feet per second, more preferably about 200 to about 500 feet per second. Air injection nozzles for directing the air into the kiln gas stream are sized so that the rate of air injection is such that the temperature of the air-diluted kiln gas stream at the point of air injection is typically not less than about 1600° F. In one preferred embodiment of the method of this invention, the air is injected into the kiln gas stream at a linear velocity of at least 100 feet per second, more preferably about 200 to about 500 feet per second, and at least a portion of the injected air is directed toward the mineral bed continuously during kiln rotation. Thus to the extent there exists some stratification of partial combustion products from the secondary burning zone, air injected toward the bed continuously during kiln operation will assure adequate oxygen concentration and mixing for oxidation of those stratified concentrations of such products of partial combustion.

The need for adequate gas stream temperatures (to allow oxidation of kiln gas components) at the point of air injection effectively limits the amount that the length of reducing zone 150 can be increased by moving the air injection apparatus further upstream. But, the length of the reducing zone 150 can also be controlled by adjusting the length of the secondary burning zone 42. One method for increasing the length of the secondary burning zone 42 is to increase the residence/burning time of the supplemental fuel charged into the kiln. Solid fuel charged into the rotating kiln typically burns in contact with the bed of in-process mineral, which under the influence of gravity moves slowly downhill counter to the flow of the kiln gas stream. Thus, assuming supplemental fuel is delivered into the rotary vessel at a given point along the length of the kiln, the length of the secondary burning zone is determined by the residence/burn time of the fuel. The supplemental fuel charged into the kiln should have a residence/burn time in the kiln sufficient to provide the preferred 1–3 second residence time for the kiln gas stream in the reducing zone 150. It is therefore important to select a supplemental fuel to optimize the length of the secondary burning zone 42, and thus the length of reducing zone 150. The supplemental fuel can be a fossil fuel, for example, lump coal, or it can be combustible waste material, such as used tires or containerized waste. An example of a process for providing controlled burning of the supplemental fuel is disclosed in U.S. Pat. No. 5,122,189, the specification of which is incorporated herein by reference.

Any one of a variety of known devices/methods can be used to charge supplemental fuel into the kiln to form a secondary burning zone. Thus supplemental fuel can be charged through a port in the wall of the rotary kiln vessel as described in U.S. Pat. No. 5,086,716 and/or U.S. Pat. No. 4,984,983, the disclosures of which are expressly incorporated herein by reference, or it can be delivered into the kiln by means of an air cannon from the fired end of the kiln as described in U.S. Pat. No. 5,086,716 or U.S. Pat. No. 4,984,983, the disclosures of which are expressly incorporated herein by reference.

As mentioned above, the effectiveness of the present method for reducing emission of nitrogen oxides in cement manufacture is also dependent upon the rapid mixing of the injected air with the kiln gas stream. One of the various apparatus illustrated in FIGS. 1–13 is utilized to assure optimum mixing of the injected air with the kiln gas stream. A goal of the present invention is to provide rapid cross sectional mixing of the injected air to create an immediate oxidizing zone at the downstream end of the reducing zone 150. The improved method of the present invention therefore provides for staged combustion within the kiln including a first oxidizing zone near the lower fired end 14 of kiln 10, a reducing zone 150 between the upstream end relative to kiln gas flow of the secondary burning zone 42 and the air injection apparatus 46, and a second oxidizing zone at air injection apparatus 46. The staged combustion not only reduces $NO_x$ emissions from cement manufacture but also reduces carbon monoxide and hydrocarbon emissions.

Although the invention has been described and defined in detail with reference to certain preferred embodiments, variations and modifications exist within the scope and spirit of the invention as described and claimed in the following claims.

What is claimed is:

1. A method for reducing the concentration of nitrogen oxides in the effluent gas emissions during operation of a conventional long rotary cement kiln comprising a rotary vessel having an upper kiln gas exit end with an adjacent mineral drying zone, and opposite fired clinker exit end with an adjacent clinkering zone and an intermediate mineral calcining zone wherein during operation a kiln gas stream flows from said clinkering zone through the calcining zone and out the kiln gas exit end of the rotary vessel and wherein in-process mineral flows from the drying zone through the clinkering zone, said method comprising the steps of:

delivering combustible material into the rotary vessel to burn it in contact with the in-process mineral at a point downstream relative to kiln gas flow of the clinkering zone to create a reducing zone extending downstream from the burning combustible material; and injecting air through at least one port in a wall of the rotary vessel and directing said injected air into the kiln gas stream upstream relative to kiln gas flow of the drying zone at a linear flow rate of at least 100 feet per second.

2. The method of claim 1, wherein the injected air is directed through an air injection tube in air flow communication with the port in the wall of the rotary vessel.

3. The method of claim 1, wherein the injected air is directed into the kiln gas stream at multiple angles so that at least a portion of the injected air is directed toward the in-process mineral continuously during kiln operation.

4. The method of claim 1, wherein the injected air is directed radially from a point proximal to the rotational axis of the rotary vessel toward the wall of the rotary vessel.

5. The method of claim 1, wherein the injected air is directed from a point proximal to the rotational axis of the kiln continuously toward the in-process mineral during rotation of the rotary vessel.

6. The method of claim 1, wherein the combustible material is delivered through a port in the wall of the rotary vessel into the calcining zone of the kiln.

7. The method of claim 1, wherein the combustible material is a conventional fossil fuel.

8. The method of claim 1, wherein the combustible material is a combustible waste.

9. The method of claim 1, further comprising the step of inducing mixing of laminar portions of the kiln gas stream in the reducing zone.

10. The method of claim 1, wherein the distance between the point of contact of the combustible material with the in-process mineral and the point of injection of air into the kiln gas stream is at least X, where X=(0.5 second)·R, and where R is the linear flow rate of the kiln gas stream in the rotary vessel.

11. The method of claim 1, wherein the air is injected into the kiln gas stream at a linear flow rate of at least 200 feet per second.

12. The method of claim 1, wherein the air is injected into the kiln gas stream at a linear flow rate of to about 200 feet per second to about 500 feet per second.

13. The method of claim 1, wherein the air is injected into the kiln gas stream at a point at which the kiln gas temperature is at least 1600° F.

14. The method of claim 1, wherein the air is injected into the kiln gas stream at a point downstream relative to kiln gas flow from the calcining zone.

15. The method of claim 14, wherein the distance between an upstream end relative to kiln gas flow of the reducing zone and the point of injection of air into the kiln gas stream is about (1 second)·R to about (3 seconds)·R, and where R is the linear flow rate of the kiln gas stream in the rotary vessel.

16. A method for reducing the concentration of nitrogen oxides in effluent gas emissions during operation of a conventional long rotary cement kiln comprising a rotary vessel having an upper kiln gas exit end with an adjacent mineral drying zone, and opposite fired clinker exit end with an adjacent clinkering zone and an intermediate mineral calcining zone wherein during operation a kiln gas stream flows from said clinkering zone through the calcining zone and out the kiln gas exit end of the rotary vessel and wherein in-process mineral flows from the drying zone through the clinkering zone, said method comprising the steps of:

delivering combustible material into the rotary vessel to burn it in contact with the in-process mineral at a point downstream relative to kiln gas flow of the clinkering zone to create a reducing zone extending downstream from the burning combustible material; and injecting air through at least one port in the wall of the rotary vessel and directing said injected air into the kiln gas stream upstream relative to kiln gas flow of the drying zone at multiple angles so that at least a portion of the injected air is directed toward the in-process mineral continuously during kiln operation.

17. The method of claim 16, wherein the injected air is directed through an air injection tube in air flow communication with the port in the wall of the rotary vessel.

18. The method of claim 16, wherein the injected air is directed radially at multiple angles from a point proximal to the rotational axis of the rotary vessel toward the wall of the rotary vessel.

19. The method of claim 16, wherein the combustible material is delivered through a port in the wall of the rotary vessel into the calcining zone of the kiln.

20. The method of claim 16, wherein the combustible material is a conventional fossil fuel.

21. The method of claim 16, wherein the combustible material is a combustible waste.

22. The method of claim 16, further comprising the step of inducing mixing of laminar portions of the kiln gas stream in the reducing zone.

23. The method of claim 16, further comprising the step of inducing mixing of laminar portions of the kiln gas stream in the reducing zone.

24. The method of claim 16, wherein the air is injected into the kiln gas stream at a linear flow rate of at least 200 feet per second.

25. The method of claim 16, wherein the air is injected into the kiln gas stream at a linear flow rate of about 200 feet per second to about 500 feet per second.

26. The method of claim 16, wherein the distance between the point of contact of the combustible material with the in-process mineral and the point of injection of air into the kiln gas stream is at least X, where X=(0.5 second)·R, and where R is the linear flow rate of the kiln gas stream in the rotary vessel.

27. The method of claim 16, wherein the air is injected into the kiln gas stream at a point at which the kiln gas temperature is at least 1600° F.

28. The method of claim 16, wherein the air is injected into the kiln gas stream at a point downstream relative to kiln gas flow from the calcining zone.

29. The method of claim 28, wherein the distance between an upstream end relative to kiln gas flow of the reducing zone and the point of injection of air into the kiln gas stream is about (1 second)·R to about (3 seconds)·R, and where R is the linear flow rate of the kiln gas stream in the rotary vessel.

* * * * *

UNITED STATES PATENT AND TRADEMARK OFFICE
Certificate

Patent No. 5,632,616                                                                         Patented: May 27, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter F. Way, Michigan City, IN; James R. Tutt, Nas, TX; Eric R. Hansen, Shawnee, KS; and Michael P. Heap, Salt Lake City, UT.

Signed and Sealed this Tenth Day of April, 2001.

DENISE ESQUIVEL
*Supervisory Patent Examiner*
Art Unit 3749

UNITED STATES PATENT AND TRADEMARK OFFICE
Certificate

Patent No. 5,632,616                                                  Patented: May 27, 1997

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Peter F. Way, Boxford, MA; James R. Tutt, Nash, TX; Eric R. Hansen, Shawnee, KS; and Michael P. Heap, Salt Lake City, UT.

Signed and Sealed this Tenth Day of July, 2001.

HENRY BENNETT
*Supervisory Patent Examiner*
Art Unit 3749